United States Patent
Tu et al.

(10) Patent No.: US 10,077,903 B2
(45) Date of Patent: Sep. 18, 2018

(54) HYBRID THROUGH HOLES AND ANGLED HOLES FOR COMBUSTOR GROMMET COOLING

(71) Applicant: United Technologies Corporation, Hartford, CT (US)

(72) Inventors: John S. Tu, West Hartford, CT (US); James B. Hoke, Tolland, CT (US); Monica Pacheco-Tougas, Walthan, MA (US); Timothy S. Snyder, Glastonbury, CT (US); Dennis M. Moura, South Windsor, CT (US); Anthony Van, Palm City, FL (US)

(73) Assignee: United Technologies Corporation, Farmington, CT (US)

( * ) Notice: Subject to any disclaimer, the term of this patent is extended or adjusted under 35 U.S.C. 154(b) by 553 days.

(21) Appl. No.: 14/886,973

(22) Filed: Oct. 19, 2015

(65) Prior Publication Data
US 2016/0201913 A1 Jul. 14, 2016

Related U.S. Application Data (60) Provisional application No. 62/066,017, filed on Oct. 20, 2014.

(51) Int. Cl.
*F23R 3/00* (2006.01)
*F23R 3/06* (2006.01)

(52) U.S. Cl.
CPC .............. *F23R 3/06* (2013.01); *F23R 3/002* (2013.01); *F23R 2900/03042* (2013.01); *F23R 2900/03044* (2013.01); *Y02T 50/675* (2013.01)

(58) Field of Classification Search
CPC ................... F23R 3/002; F23R 3/06; F23R 2900/03041–2900/03044; F05D 2260/201–2260/203; F05B 2260/201–2260/203; F02K 1/822
See application file for complete search history.

(56) References Cited

U.S. PATENT DOCUMENTS

| | | | |
|---|---|---|---|
| 3,420,058 | A | 1/1969 | Howald |
| 3,540,811 | A | 11/1970 | Davis |
| 4,622,821 | A | 11/1986 | Madden |
| 5,526,549 | A | 6/1996 | Mori |
| 5,837,964 | A | 11/1998 | Emer |
| 5,993,337 | A | 11/1999 | Janes |

(Continued)

FOREIGN PATENT DOCUMENTS

WO 2014/112992 7/2014

OTHER PUBLICATIONS

EP search report for EP15190675.7 dated Feb. 19, 2016.

(Continued)

*Primary Examiner* — Craig Kim
*Assistant Examiner* — Katheryn Malatek
(74) *Attorney, Agent, or Firm* — O'Shea Getz P.C.

(57) ABSTRACT

Aspects of the disclosure are directed to a cooling design feature for inclusion in a liner of an aircraft, comprising: a plurality of angled holes, and at least one through hole separating all combinations of any two of the angled holes, wherein the at least one through hole is oriented at an angle that is substantially perpendicular to a surface of the liner, and wherein each of the plurality of angled holes are non-parallel to the at least one through hole.

10 Claims, 5 Drawing Sheets

(56) References Cited

U.S. PATENT DOCUMENTS

| | | | |
|---|---|---|---|
| 6,427,446 B1 | 8/2002 | Kraft | |
| 7,820,267 B2 | 10/2010 | Fahndrich | |
| 8,624,151 B2 | 1/2014 | Elfizy | |
| 8,631,557 B2 | 1/2014 | Elfizy | |
| 2005/0022531 A1* | 2/2005 | Burd | F23R 3/002 60/752 |
| 2010/0122537 A1* | 5/2010 | Yankowich | F23R 3/005 60/754 |
| 2010/0212324 A1* | 8/2010 | Bronson | F02C 7/264 60/752 |
| 2011/0185740 A1 | 8/2011 | Dierberger et al. | |
| 2012/0272521 A1* | 11/2012 | Lee | B21K 3/00 29/888.01 |

OTHER PUBLICATIONS

Yiping Lu, "Effect of Hole Configurations on Film Cooling From Cylindrical Inclined Holes for the Application to Gas Turbine Blades", A Dissertation Submitted to the Graduate Faculty of the Louisiana Sate University and Agricultural and Mechanical College, Dec. 2007.

* cited by examiner

HYBRID THROUGH HOLES AND ANGLED HOLES FOR COMBUSTOR GROMMET COOLING

This application claims priority to U.S. patent application Ser. No. 62/066,017 filed Oct. 20, 2014.

BACKGROUND

Combustor dilution holes are utilized to tailor profile and pattern factors of an aircraft combustor. A combustor grommet defines the geometry of the dilution hole. The width of the grommet, which provides a seal land for a cold sheet, is often determined by an associated tolerance between the cold sheet and a hot sheet of the combustor. A region of the combustor or grommet where cooling is limited may lead to high temperatures and rapid oxidation. The high temperatures/oxidation imposed on the grommet may reduce the durability and lifetime of the combustor.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a cooling design feature for inclusion in a liner of an aircraft, comprising: a plurality of angled holes, and at least one through hole separating all combinations of any two of the angled holes, wherein the at least one through hole is oriented at an angle that is substantially perpendicular to a surface of the liner, and wherein each of the plurality of angled holes are non-parallel to the at least one through hole. In some embodiments, the cooling design feature includes a grommet, and the entirety of the grommet is configured to include an alternating sequence of through holes and angled holes. In some embodiments, the at least one through hole includes at least two through holes that are directly adjacent to one another. In some embodiments, the at least two through holes that are directly adjacent to one another are proximate to a rib. In some embodiments, the cooling design feature includes a grommet, and the grommet is configured to be included in a gas turbine engine liner of the aircraft.

Aspects of the disclosure are directed to a gas turbine engine liner for an aircraft, comprising: a shell, a panel coupled to the shell and comprising at least one cooling design feature, wherein the at least one cooling design feature includes: a plurality of angled holes, and at least one through hole separating all combinations of any two of the angled holes, wherein the at least one through hole is oriented at an angle that is substantially perpendicular to a surface of the liner, and wherein each of the plurality of angled holes are non-parallel to the at least one through hole. In some embodiments, the panel includes threaded studs configured to allow the panel to be bolted to the shell. In some embodiments, the shell includes a plurality of impingement holes and the panel includes a plurality of effusion holes. In some embodiments, the cooling design feature includes a grommet, and the entirety of the grommet is configured to include an alternating sequence of through holes and angled holes. In some embodiments, the at least one through hole includes at least two through holes that are directly adjacent to one another. In some embodiments, the at least two through holes that are directly adjacent to one another are proximate to a rib. In some embodiments, the liner further comprises a groove configured to provide a passage for cooling air with respect to the at least one through hole.

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for cooling a grommet of an aircraft combustor. The grommet, which may be incorporated into a liner associated with the combustor, may include one or more through holes and/or one or more angled holes. The angled holes may be characterized by a compound angle, such that the angled holes may be oriented at an angle relative to a surface of the liner and at an angle relative to a stream-wise orientation. Various sequences/patterns may be used for the through holes and the angled holes.

Figure 1:
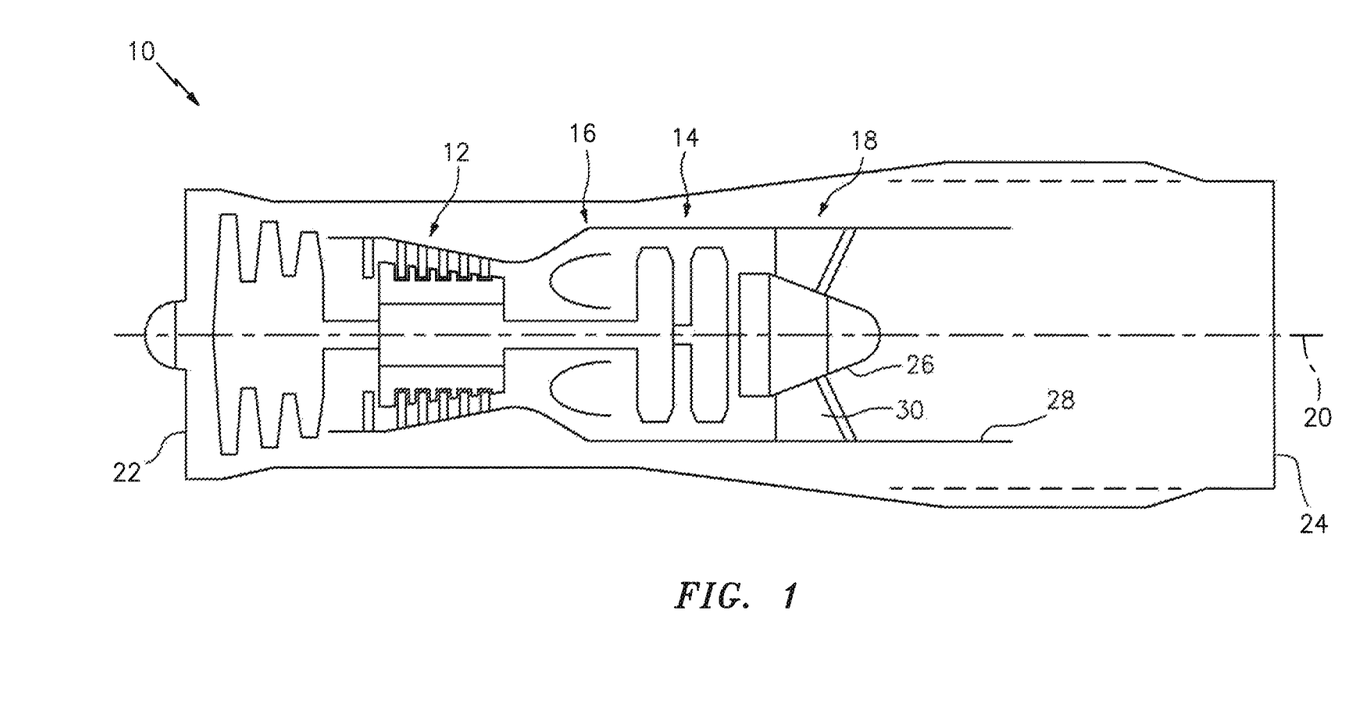
FIG. 1 illustrates an exemplary gas turbine engine.

Aspects of the disclosure may be applied in connection with an aircraft, or portion thereof. For example, aspects of the disclosure may be applied in connection with a gas turbine engine. FIG. 1 is a side-sectional illustration of an exemplary gas turbine engine 10. The engine 10 includes a compressor section 12, a turbine section 14 and one or more engine hot sections. The engine hot sections may include, for example, a first engine hot section 16 configured as a combustor section and a second engine hot section 18 configured as an augmentor section. The compressor section 12, the first engine hot section 16, the turbine section 14 and the second engine hot section 18 may be sequentially aligned along an axial centerline 20 between a forward engine airflow inlet 22 and an aft engine airflow exhaust 24.

Figure 2A:
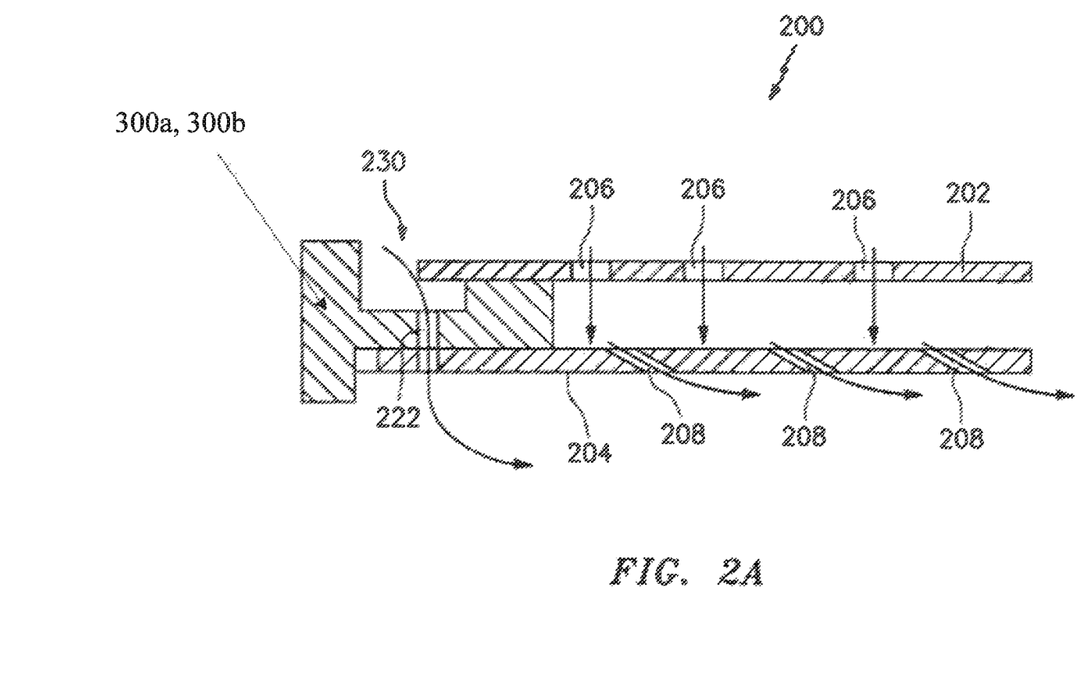
FIGS. 2A-2B illustrates an exemplary liner of the engine of FIG. 1.
Figure 2B:
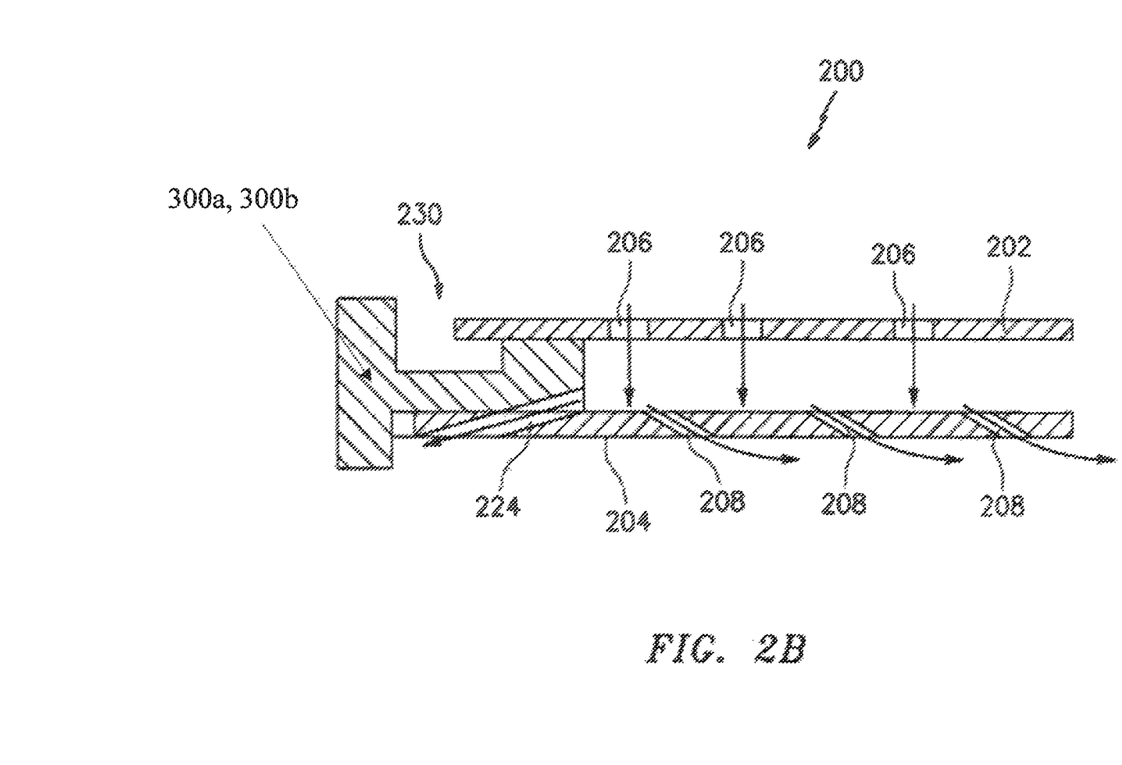

Referring to FIGS. 2A-2B, a portion of a liner 200 associated with a combustor (e.g., combustor/first engine hot section 16 of FIG. 1) is shown. The liner 200 may be composed of one or more materials, such as one or more metals or metal alloys. The melting point temperature of the liner 200 may generally be less than the temperatures experienced within the combustor, such that the liner 200 is designed to include holes or passages as described in further detail below in order to cool the liner 200 and any associated devices/components.

The liner 200 includes an isothermal carrying structure/shell 202. Coupled to the shell 202 is a panel 204. The panel 204 may be referred to as, or correspond to, a float wall panel. A float wall panel is a panel that is designed to expand under a heat-load without cracking. The panel 204 may take the form of a tiled structure that includes threaded studs (not shown in FIGS. 2A-2B), that allow the panel 204 to be bolted to the shell 202.

The shell 202 includes one or more impingement holes 206. The impingement holes 206 may be approximately 0.635 millimeters in diameter. Air may enter the impingement holes 206 in a direction that is substantially perpendicular to the plane/surface of the shell 202 and the air may impinge on/contact a surface of the panel 204. The air that impinges on the surface of the panel 204 may serve to cool the panel 204. The air that impinges on the panel 204 subsequently exits via effusion holes 208. Accordingly the tile of the panel 204 is generally sealed, but for the effusion holes 208 to allow for the exit of the impingement air.

Figure 3A:
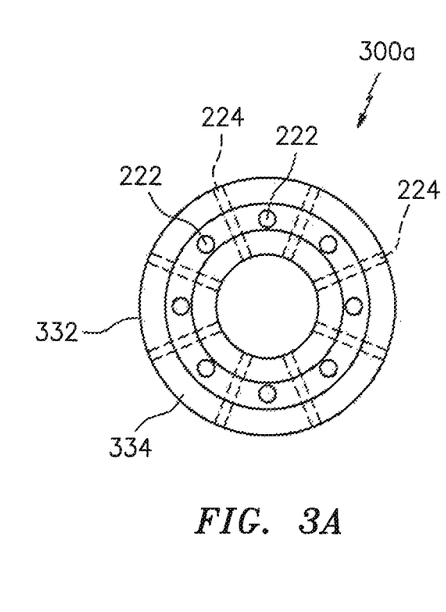
FIGS. 3A-3B illustrate exemplary grommets including sequences/patterns of through holes and angled holes.
Figure 3B:
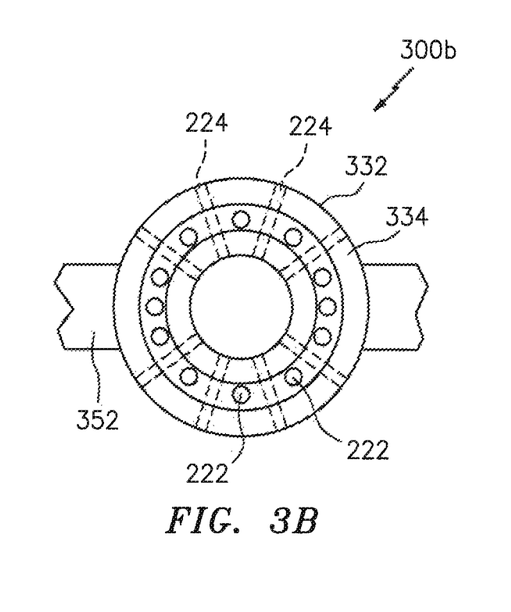
Figure 4:
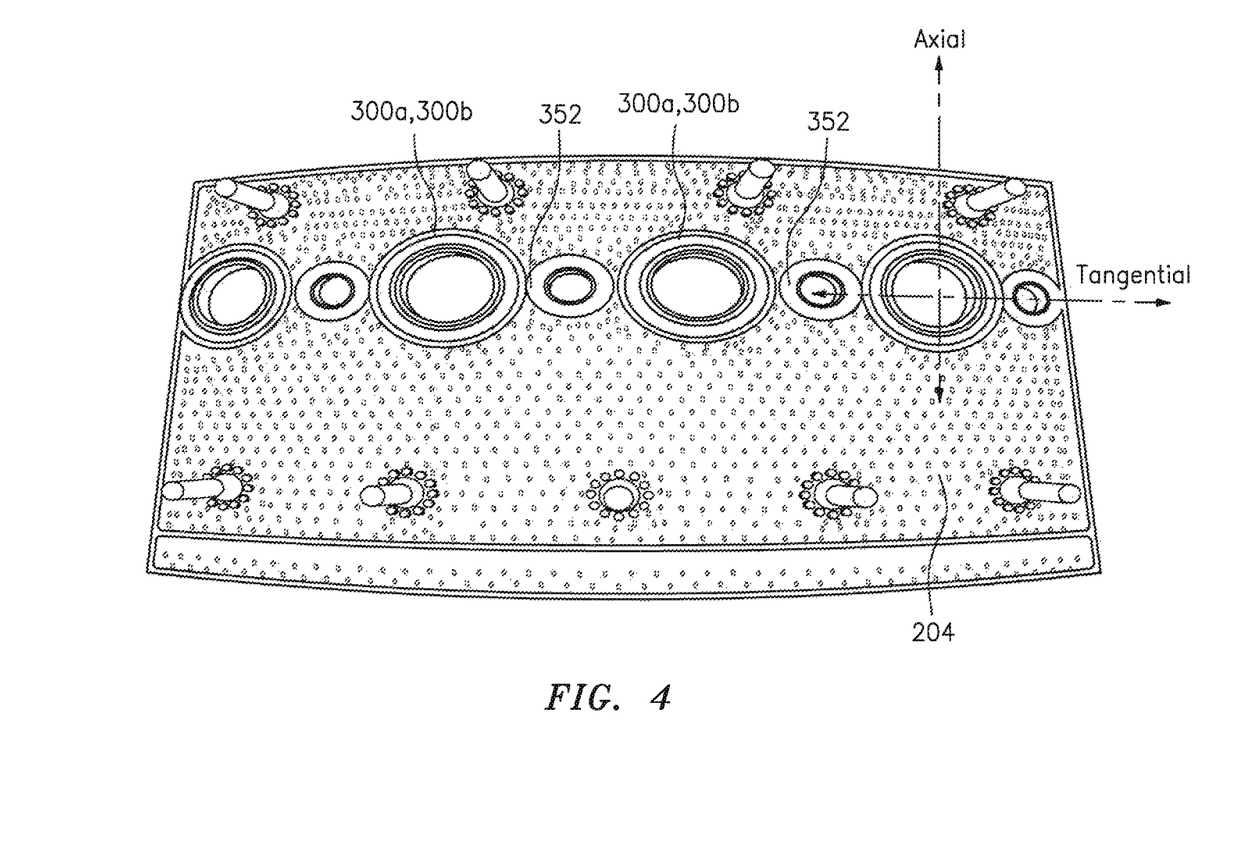
FIG. 4 illustrates an exemplary portion of the liner of FIGS. 2A-2B.

Referring to FIGS. 2A-2B and FIGS. 3A-3B, the liner 200 may include one or more grommets, such as grommets 300a and 300b. The grommets 300a and 300b may provide for dilution holes to manage the combustion associated with the engine 10 of FIG. 1. An illustrative combination of the grommets 300a, 300b with the panel 204 is shown in FIG. 4. The grommets 300a and 300b may be formed as part of the panel 204 (e.g., all one casting).

The grommets 300a, 300b are thicker than the rest of the panel 204, such that the shell 202 sits on top of the grommets 300a, 300b when the shell 202 is coupled to the panel 204. In some applications it may be desirable to cool the grommets 300a, 300b beyond the cooling associated with the impingement air provided by, e.g., the impingement holes 206. In order to additionally cool the grommets 300a, 300b, one or more through holes 222 and/or one or more angled holes 224 may be included in the liner 200 as shown in FIGS. 2A-2B and FIGS. 3A-3B.

The angled holes 224 may be drilled into a side wall 332 of the grommets 300a, 300b to provide cooling to the main body/portion 334 of the grommet 300a, 300b. The side wall 332 corresponds to the farthest wall from the center of the dilution hole. The grommet body 334 is the entire mass from that side wall 332 towards the center of the dilution hole. The angled holes 224 may be drilled in a radial fashion relative to the circular center of the grommet 300a, 300b.

The through holes 222 may be oriented at an angle that is substantially perpendicular to the surface of the liner 200. The angled holes 224 may be oriented at an angle relative to the through holes 222, which is to say that the angled holes 224 may be non-parallel to the through holes 222.

The angled holes 224 may be referenced as having a characteristic compound angle, which is to say that in addition to having an angle/orientation relative to the surface of the liner 200 or the through holes 224, the angled holes 224 may generally include any stream-wise orientation. For example, and referring to FIG. 4, in dashed lines axial and tangential directions/axes have been super-imposed for reference purposes. The angled holes 224 may assume any stream-wise orientation/angle with respect to those axes.

If, when taken collectively, the angled holes 224 assume more than one direction/orientation with respect to the axial and tangential axes, a first angled hole 224 may be separated from a second angled hole 224 by at least one through hole 222. For example, the grommets 300a-300b of FIGS. 3A-3B include alternating sequences of through holes 222 and angled holes 224. The entirety of the grommet 300a includes alternating sequences of through holes 222 and angled holes 224. The grommet 300b illustrates a sequence of through holes 222 and angled holes 224, wherein two or more through holes 222 are directly adjacent to one another (in proximity to ribs 352, for example). In FIGS. 3A-3B, at least one through hole 222 separates all combinations of any two of the angled holes 224.

As shown in FIGS. 2A-2B, a groove 230 may be included in the liner 200 to provide a passage for cooling air with respect to the through holes 222 and/or the angled holes 224.

In some areas/portions of the liner 200 (e.g., the panel 204), it might not be cost-effective to install angled holes 224. For example, and referring to FIG. 3B and FIG. 4, due to the presence of a rib 352 to the adjacent grommet, it might not be cost-effective to include angled holes 224 in proximity to the rib 352. Accordingly, one or more through holes 222 may be included in an area/portion that is proximate to the rib 352.

Technical effects and benefits of this disclosure include a cost-effective design for a grommet. Cooling may be provided to a grommet via an arrangement of through holes and angled holes in the grommet.

While some of the examples described herein related to grommets, aspects of the disclosure may be applied in connection with any cooling design feature around combustion dilution holes. Aspects of the disclosure may be utilized in connection with a cooling design feature that is applied to at least one large opening (e.g., larger than a threshold) in a combustor liner. In some embodiments, one or more of the holes described herein may be drilled in a panel.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A combustor of a gas turbine engine, comprising:
    a liner including a grommet and a panel, the grommet including
        a plurality of angled holes; and
        at least one grommet through hole separating all combinations of any two angled holes of the plurality of angled holes around a perimeter of the grommet; and
    the panel including a panel through hole,
    wherein the at least one grommet through hole is oriented at an angle that is substantially perpendicular to a surface of the liner, and wherein each angled hole of the plurality of angled holes are non-parallel to the at least one grommet through hole,
    wherein a first grommet through hole of the at least one grommet through hole and the panel through hole are co-axial such that cooling air passes through the first grommet through hole and the panel through hole.

2. The combustor of claim 1, wherein the grommet includes an alternating sequence of grommet through holes and angled holes around the perimeter of the grommet.

3. The combustor of claim 1, wherein the at least one grommet through hole includes a second grommet through hole that is directly adjacent to the first grommet through hole.

4. The combustor of claim 3, wherein the first grommet through hole and the second grommet through hole are proximate to a rib.

5. A gas turbine engine liner, comprising:
- a shell;
- a panel coupled to the well, the panel including a panel through hole; and
- a grommet; that includes:
    - a plurality of angled holes; and
    - at least one grommet through hole separating all combinations of any two angled holes of the plurality of angled holes around a perimeter of the grommet,
- wherein the at least one grommet through hole is oriented at an angle that is substantially perpendicular to a surface of the liner, and
- wherein each angled hole of the plurality of angled holes are non-parallel to the at least one grommet through hole, and
- wherein a first grommet through hole of the at least one grommet through hole and the panel through hole are co-axial such that cooling air passes through the first grommet through hole and the panel through hole.

6. The gas turbine engine liner of claim 5, wherein the shell includes a plurality of impingement holes and wherein the panel includes a plurality of effusion holes.

7. The gas turbine engine liner of claim 5, wherein the grommet includes an alternating sequence of grommet through holes and angled holes around the perimeter of the grommet.

8. The gas turbine engine liner of claim 5, wherein the at least one grommet through hole includes a second grommet through hole that is directly adjacent to the first grommet through hole.

9. The gas turbine engine liner of claim 8, wherein the first grommet through hole and the second grommet through hole are proximate to a rib.

10. The gas turbine engine liner of claim 5, further comprising:
- a groove configured to provide a passage for the cooling air with respect to the first grommet through hole.

\* \* \* \* \*

UNITED STATES PATENT AND TRADEMARK OFFICE
CERTIFICATE OF CORRECTION

PATENT NO. : 10,077,903 B2
APPLICATION NO. : 14/886973
DATED : September 18, 2018
INVENTOR(S) : Tu et al.

Page 1 of 1

It is certified that error appears in the above-identified patent and that said Letters Patent is hereby corrected as shown below:

In the Claims

Column 5, Line 6, please delete "well" and insert --shell--.

Signed and Sealed this
Twenty-third Day of October, 2018

Andrei Iancu
*Director of the United States Patent and Trademark Office*